D. F. OLIVER.
SEAT SUSPENSION.
APPLICATION FILED SEPT. 30, 1915. RENEWED MAR. 6, 1918.
1,278,730.
Patented Sept. 10, 1918.
3 SHEETS—SHEET 1.
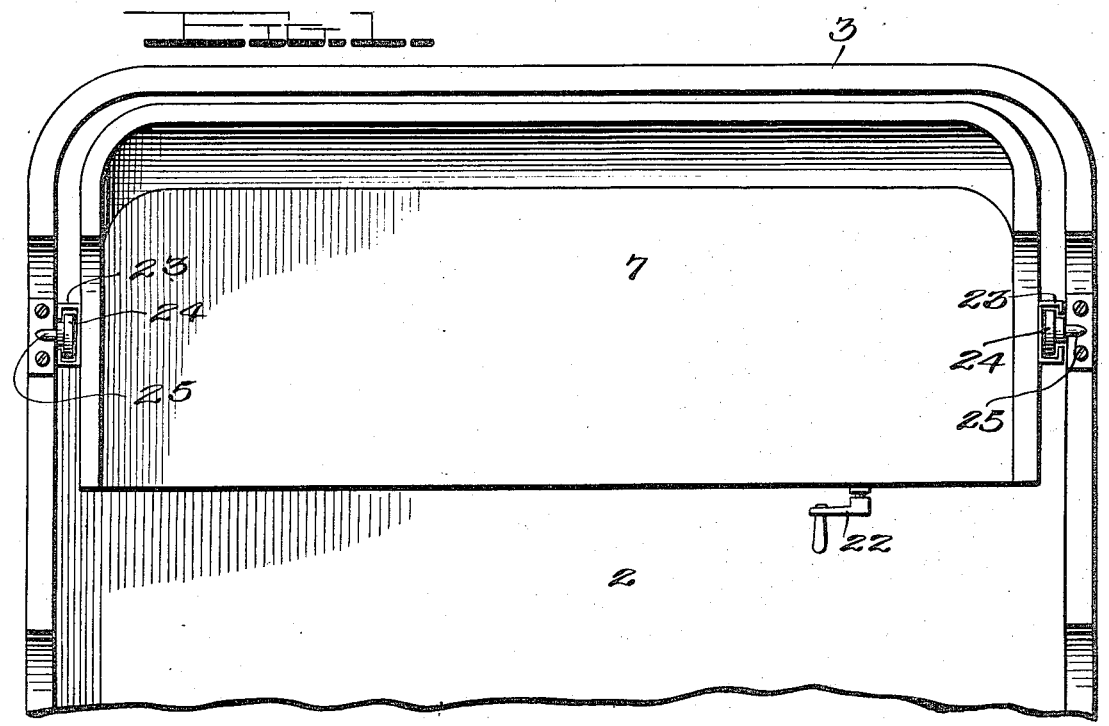
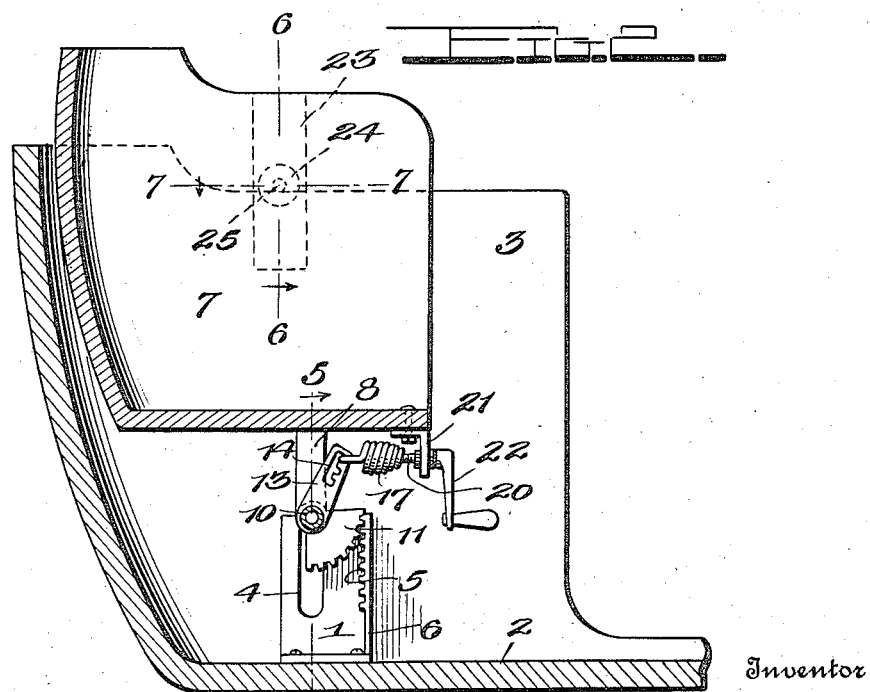
Inventor
Doctor F. Oliver,
By G. H. Strong
Attorney

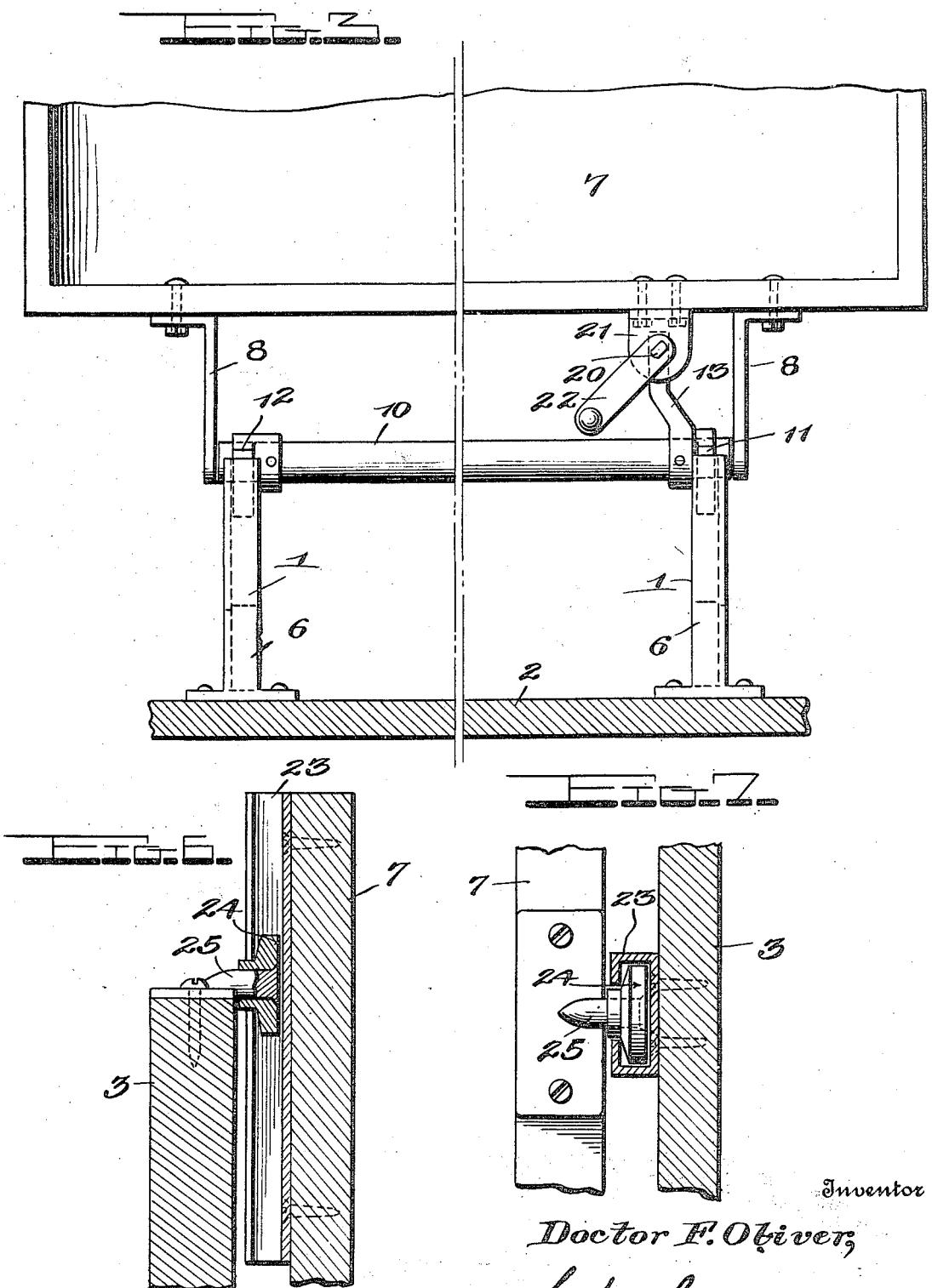

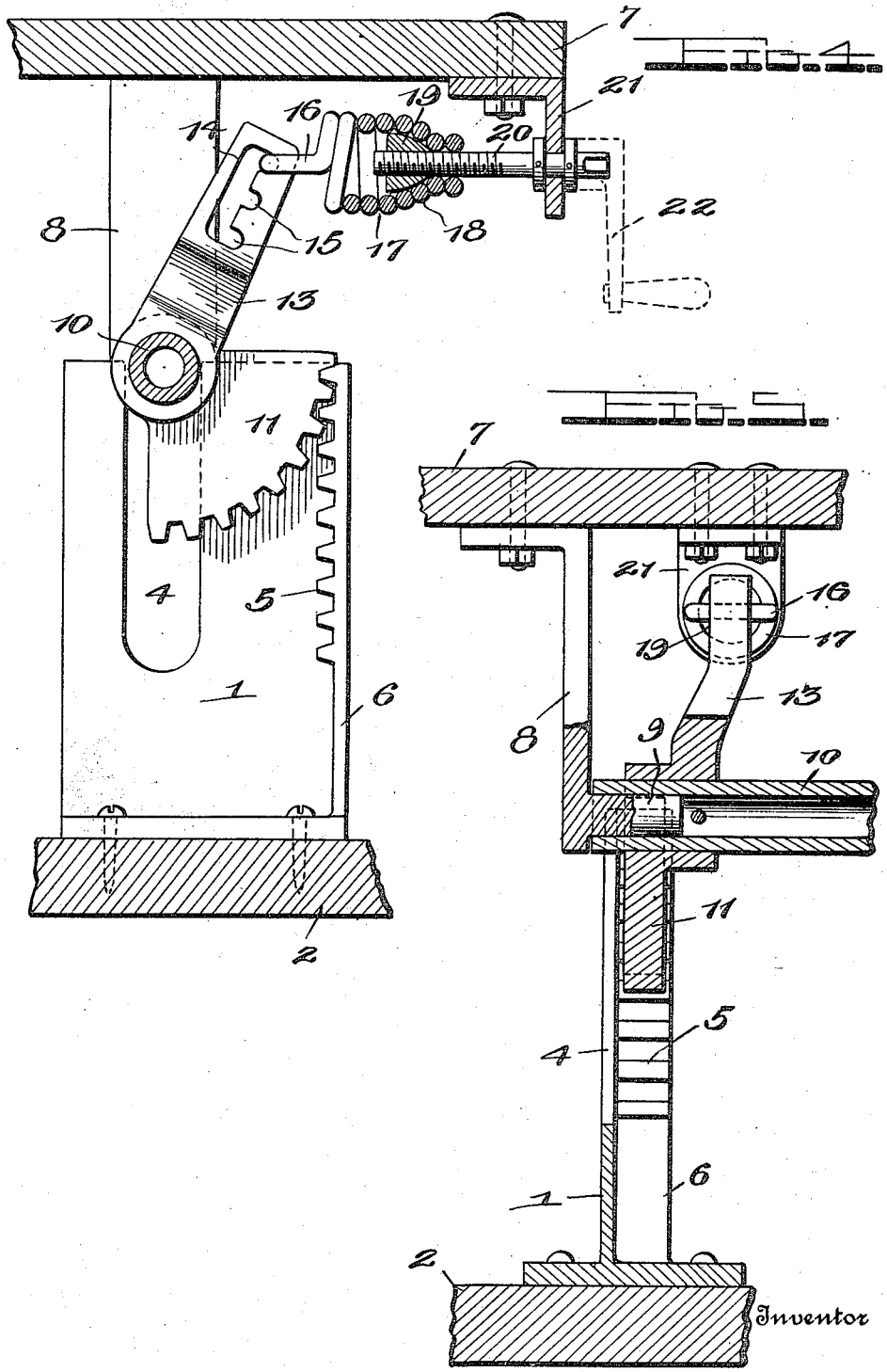

UNITED STATES PATENT OFFICE.

DOCTOR FRANKLIN OLIVER, OF OAKLAND, CALIFORNIA; LILLIE F. OLIVER, EXECUTRIX OF D. FRANKLIN OLIVER, DECEASED.

SEAT SUSPENSION.

1,278,730.  Specification of Letters Patent.  Patented Sept. 10, 1918.

Application filed September 30, 1915, Serial No. 53,361. Renewed March 6, 1918. Serial No. 220,871.

*To all whom it may concern:*

Be it known that I, DOCTOR FRANKLIN OLIVER, a citizen of the United States, residing at Oakland, in the county of Alameda and State of California, have invented certain new and useful Improvements in Seat Suspension, of which the following is a specification.

This invention relates to certain new and useful improvements in seat suspension and particularly to a suspension or mounting for automobile seats.

The primary object of the invention is to provide an improved yieldable mounting for a seat wherein the latter will constantly maintain its horizontal disposition or, in other words, will remain parallel with the floor of the vehicle during yielding of the seat.

Another object resides in the means for varying the tension of the spring embodied in the seat suspension.

Further, the invention resides in the features of construction hereinafter described and claimed, the preferred embodiment being illustrated in the accompanying drawings, wherein:

Figure 1 is a top plan of my improved seat applied to a vehicle body which is shown in part;

Fig. 2 is a vertical section through Fig. 1;

Fig. 3 is a fragmentary front elevation of the seat with its underlying suspension;

Fig. 4 is a vertical section taken through Fig. 3;

Fig. 5 is a similar view on line 5—5 of Fig. 2; and

Figs. 6 and 7 are sections taken through the end guides of the seat on lines 6—6 and 7—7, respectively of Fig. 2.

The invention in the present or illustrated embodiment comprises spaced standards 1 secured to the floor 2 of the vehicle body 3 and each formed with a vertical slot 4, opening through the upper edge, and a rack 5 formed on the forward, inturned edge or flange 6.

Fixed to the underside of seat 7 is a pair of depending brackets 8 having inwardly directed stubs or trunnions 9 on which freely rotates a tubular shaft 10. This shaft slidably engages in the slots 4 of standards 1 and fixedly carries the segmental gears 11 and 12 adjacent the standards for meshing with the racks 5 thereof.

Gear 11 is provided with an upwardly extending arm 13 which is slotted at 14 and formed with a series of seats 15 along one edge of the slot. These seats 15 extend in a radial line from the shaft 10 and are adapted to be selectively engaged by a looped terminal 16 of a coiled spring 17, the opposite end portion of the latter being contracted or cone-shaped, as indicated at 18, to form a housing for and be engaged by a correspondingly contoured nut 19. A shaft 20 journaled in a depending bracket 21 on the seat 7 extends through the contracted end of the spring and threadedly engages the nut 19. The opposite end of the shaft is formed to receive a handle 22 whereby the shaft may be rotated to advance or retract the nut 19 and correspondingly decrease or increase the tension of the spring.

The opposite ends of the seat carry centrally and vertically disposed, channeled guides 23 in each of which engages a roller 24 mounted on a stub shaft 25 fixed on the vehicle body.

In operation, a relative movement of the seat toward the floor 2 will cause the guides 23 to move vertically of the rollers 24 and through brackets 8, the shaft will travel down in the slots 4. This latter operation will be resisted by the meshing gears and racks, resulting in rotation of the shaft 10 which swings the arm 13 rearwardly against the action of the spring. By adjusting the nut 19 the tension of the spring may be varied for supporting different weights. Engaging the spring loop 16 in an inner or lower notch, the leverage will be shortened and thereby render the suspension especially yieldable and adaptable for light loads.

What is claimed is:

1. A seat suspension comprising spaced slotted standards each having a rack portion, a pair of depending brackets adapted to be secured to the seat and carrying inwardly directed trunnions, a rotatable shaft carried by the trunnions and operable in the slots of the standards, spaced segmental gears fixed on the shaft and meshing with the racks of the standards, an upwardly extending arm carried by one of the gears, a third bracket carried by the seat, a shaft journaled in the last bracket, and a spring having one end secured to the arm and the opposite end adjustably secured to the second shaft.

2. A seat suspension comprising spaced slotted standards each having a rack portion, a pair of depending brackets adapted to be secured to the seat and carrying inwardly directed trunnions, a rotatable shaft carried by the trunnions and operable in the slots of the standards, spaced segmental gears fixed on the shaft and meshing with the racks of the standards, an upwardly extending arm carried by one of the gears, a third bracket carried by the seat, a shaft journaled in the last bracket, a coiled spring having one end engaging the arm and the opposite end portion adjustably engaged with the second shaft, and seat guiding means arranged at the opposite ends of the seat.

3. In a seat suspension, spaced slotted standards, vertical racks thereby, spaced depending brackets arranged outwardly of the standards, a shaft journaled on the brackets and operable in the slots of the standards, spaced gears fixed on the shaft and operatively connected with the racks, an arm extending radially from the shaft and formed with a series of seats, and an adjustable spring means adapted for selective engagement on the seats of the arm to hold the latter in normal position.

4. In a seat suspension, spaced slotted standards, vertical racks thereby, spaced depending brackets arranged outwardly of the standards, a shaft journaled on the brackets and operable in the slots of the standards, spaced gears fixed on the shaft and operatively connected with the racks, an arm carried by the shaft, and a spring having one end operatively connected to the arm and the opposite end fixed.

5. In a seat suspension, spaced slotted standards, vertical racks thereby, spaced depending brackets arranged outwardly of the standards, a shaft journaled on the brackets and operable in the slots of the standards, spaced gears fixed on the shaft and operatively connected with the racks, and adjustable spring means tending to hold the shaft in the upper ends of the standard slots.

6. In a seat suspension, a rack, a gear adapted to be swingingly carried by a seat and operatively connected to the rack, an arm operable by the gear, and a spring having one terminal engaging with the arm and the opposite end fixed.

7. In combination, a seat, a rotatable shaft, a spring connected to the shaft for yieldably holding the latter against rotation under the weight of the seat, and a support with which the shaft is adapted for having rolling contact against the action of the spring.

8. In combination, a seat, a shaft rotatably carried thereby, a segment fixed on the shaft, a spring arranged to tend to hold the shaft against rotation, and a support on which the segment is adapted to have rolling contact.

9. In a seat suspension, spaced depending brackets on the seat having inwardly directed trunnions, a rotatable shaft receiving the trunnions, spaced standards having slots in which the shaft is operable, racks adjacent the standards, spaced gears fixed on the shaft and meshing with the racks, and spring means connected with the gears for opposing the movement thereof along the racks.

10. In a seat suspension, spaced depending brackets on the seat having inwardly directed trunnions, a rotatable shaft receiving the trunnions, a standard having a slot in which the shaft is operable, a rack, and a spring retracted gear on the shaft meshing with the rack.

11. In a seat suspension, a shaft carried by the seat, a gear on the shaft, a rack meshing with the gear, and spring means connected with the gear and tending to hold the latter at one end of the rack.

12. In a seat suspension, a gear swingingly supported by the seat, a stationary rack operably connected with the gear, and spring means connecting the gear and seat for returning and holding the gear in normal position.

13. In a seat suspension, a shaft carried by the seat, a gear on the shaft, a rack meshing with the gear, spring means connected with the gear and tending to hold the latter at one end of the rack, channeled guides on the ends of the seats, and fixed members coöperating with the guides.

In testimony whereof I affix my signature in the presence of two witnesses.

DOCTOR FRANKLIN OLIVER.

Witnesses:
 ANNETTE MARKHAM,
 H. E. WOLCOTT.